US011918532B2

(12) United States Patent
Jones

(10) Patent No.: US 11,918,532 B2
(45) Date of Patent: Mar. 5, 2024

(54) ADJUSTABLE WEIGHTED ROLLER

(71) Applicant: Coulter Ventures, LLC., Columbus, OH (US)

(72) Inventor: Dylan Jones, Santa Barbara, CA (US)

(73) Assignee: Coulter Ventures, LLC., Columbus, OH (US)

( * ) Notice: Subject to any disclaimer, the term of this patent is extended or adjusted under 35 U.S.C. 154(b) by 518 days.

(21) Appl. No.: 17/068,450

(22) Filed: Oct. 12, 2020

(65) Prior Publication Data

US 2021/0022954 A1 Jan. 28, 2021

Related U.S. Application Data

(60) Provisional application No. 62/913,516, filed on Oct. 10, 2019.

(51) Int. Cl.

*A63B 21/072* (2006.01)
*A61H 15/00* (2006.01)
*A63B 21/075* (2006.01)

(52) U.S. Cl.

CPC ..... *A61H 15/0092* (2013.01); *A63B 21/0728* (2013.01); *A63B 21/075* (2013.01); *A61H 2201/1635* (2013.01)

(58) Field of Classification Search

CPC .............. A63B 21/0728; A63B 21/075; A63B 71/0036; A63B 2209/00; A63B 2225/09; A61H 1/00; A61H 15/0092; A61H 2201/1635

See application file for complete search history.

(56) References Cited

U.S. PATENT DOCUMENTS 2,221,785 A * 11/1940 Douglas ............. A61H 15/0092 601/120
2,546,095 A 3/1951 Walter
D253,373 S 11/1979 Celeste
D256,503 S 8/1980 Moustakas (Continued)

OTHER PUBLICATIONS

Body Tempering web page from <https://web.archive.org/web/20190126122832/https://bodytempering.com/body-tempering/>, dated Jan. 26, 2019.

(Continued)

*Primary Examiner* — Joshua Lee
(74) *Attorney, Agent, or Firm* — Banner & Witcoff, Ltd.

(57) ABSTRACT

A roller assembly includes a roller body having a rounded outer surface, an end opening, and an internal cavity extending inwardly along an axial direction from the end opening and configured to receive a weight assembly including one or more weights, a weight holder received within the cavity and configured for holding the weight assembly within the cavity, and a retaining structure engaged with the roller body to retain the weight holder and the weight assembly within the cavity. The weight holder includes first and second engaging members to engage first and second ends of the weight assembly that are spaced in the axial direction, to limit movement of the weight assembly along the axial direction. At least one of the first and second engaging members is positionable in different axial positions relative to the other, such that the engaging members can accommodate changes in size of the weight assembly.

27 Claims, 12 Drawing Sheets

(56) References Cited

U.S. PATENT DOCUMENTS

| | | | | |
|---|---|---|---|---|
| 4,431,185 | A * | 2/1984 | Cisneros | A63B 21/072 220/318 |
| D274,649 | S | 7/1984 | Shiu | |
| D299,972 | S | 2/1989 | Moore | |
| D303,974 | S | 10/1989 | Karr | |
| D361,132 | S | 8/1995 | Lee | |
| D371,331 | S | 7/1996 | Mooradian | |
| D375,578 | S | 11/1996 | Tibri et al. | |
| 5,577,995 | A * | 11/1996 | Walker | A61H 15/0092 601/118 |
| D381,851 | S | 8/1997 | Sharpe | |
| 6,379,286 | B1 | 4/2002 | Scopino et al. | |
| D469,924 | S | 2/2003 | Farrell | |
| D546,402 | S | 7/2007 | Sonnier | |
| D567,952 | S | 4/2008 | Fink | |
| D567,954 | S | 4/2008 | Fink | |
| D567,955 | S | 4/2008 | Fink | |
| D578,260 | S | 10/2008 | Fellinger | |
| D660,450 | S | 5/2012 | Johnson | |
| D670,817 | S | 11/2012 | Narevsky | |
| D689,155 | S | 9/2013 | Jahns | |
| D693,934 | S | 11/2013 | Lin | |
| D700,346 | S | 2/2014 | Palizzi et al. | |
| D700,709 | S | 3/2014 | Khodabakhshian | |
| D713,050 | S | 9/2014 | Kao | |
| D736,398 | S | 8/2015 | Kwon | |
| D737,456 | S | 8/2015 | McDonough et al. | |
| D744,112 | S | 11/2015 | Phillips et al. | |
| D749,233 | S | 2/2016 | Phillips | |
| D755,304 | S | 5/2016 | Ackerman | |
| D764,066 | S | 8/2016 | Somjee | |
| 9,550,088 | B2 * | 1/2017 | Coompol | B65D 71/06 |
| D785,103 | S | 4/2017 | Townsend | |
| D788,313 | S | 5/2017 | Lawrie | |
| 9,649,521 | B2 * | 5/2017 | Miller | A63B 71/0036 |
| D800,330 | S | 10/2017 | Loos | |
| D801,400 | S | 10/2017 | Willison et al. | |
| D805,649 | S | 12/2017 | Mizelle et al. | |
| D809,612 | S | 2/2018 | Ganea | |
| D822,772 | S | 7/2018 | Jorgenson et al. | |
| D825,695 | S | 8/2018 | Kim | |
| D827,846 | S | 9/2018 | De Nitto | |
| D829,920 | S | 10/2018 | Carpinelli | |
| D833,026 | S | 11/2018 | Khodabakhshian | |
| D833,027 | S | 11/2018 | Viner et al. | |
| D833,635 | S | 11/2018 | Chen | |
| D842,486 | S | 3/2019 | Kaoru | |
| D845,498 | S | 4/2019 | Johnson | |
| 10,265,563 | B2 * | 4/2019 | Miller | A61H 15/0092 |
| D849,338 | S | 5/2019 | Becattini, Jr. et al. | |
| 10,307,325 | B1 | 6/2019 | Johnson | |
| D863,579 | S | 10/2019 | Wang | |
| D863,583 | S | 10/2019 | Carpinello | |
| D871,685 | S | 12/2019 | McMillan et al. | |
| D872,198 | S | 1/2020 | Kim | |
| D872,387 | S | 1/2020 | Crane | |
| D874,184 | S | 2/2020 | Chou | |
| D875,962 | S | 2/2020 | Spratt | |
| D876,657 | S | 2/2020 | Lin | |
| 10,561,923 | B1 | 2/2020 | Harvey | |
| D878,618 | S | 3/2020 | Kafker et al. | |
| D882,805 | S | 4/2020 | Lien | |
| D883,503 | S | 5/2020 | Pasquale | |
| D884,804 | S | 5/2020 | Ross | |
| D886,314 | S | 6/2020 | Morris et al. | |
| D887,094 | S | 6/2020 | Ruan | |
| D903,890 | S | 12/2020 | Spratt | |
| 2004/0204664 | A1 | 10/2004 | Chu | |
| 2015/0133835 | A1 | 5/2015 | Fadil et al. | |
| 2015/0209220 | A1 * | 7/2015 | Lin | A61H 15/0092 601/119 |
| 2015/0328491 | A1 * | 11/2015 | Miller | A63B 21/4025 482/121 |
| 2015/0343256 | A1 * | 12/2015 | Coompol | A63B 21/0722 482/93 |
| 2016/0235619 | A1 | 8/2016 | Yeh | |
| 2016/0279009 | A1 | 9/2016 | Somjee | |
| 2016/0331628 | A1 | 11/2016 | Kuo | |
| 2017/0209727 | A1 * | 7/2017 | Miller | A63B 23/03525 |
| 2017/0216133 | A1 | 8/2017 | Yih | |
| 2017/0252262 | A1 | 9/2017 | Chang | |
| 2017/0312169 | A1 | 11/2017 | Polenik et al. | |
| 2018/0289581 | A1 | 10/2018 | Zook | |
| 2018/0326254 | A1 | 11/2018 | Earls et al. | |
| 2018/0353370 | A1 * | 12/2018 | Liao | A61H 15/0085 |
| 2019/0060160 | A1 | 2/2019 | Krichevsky et al. | |
| 2019/0110947 | A1 | 4/2019 | Ekema et al. | |
| 2019/0343713 | A1 | 11/2019 | Boghosian | |
| 2020/0030181 | A1 | 1/2020 | Lin et al. | |

OTHER PUBLICATIONS

Photos of body tempering rollers from <https://web.archive.org/web/20190126122832/https://bodytempering.com/body-tempering/>, dated Jan. 26, 2019.

Kabuki Strength Body Tempering product listings from <https://web.archive.org/web/20170224042536/http://store.kabukistrength.net/collections/body-tempering>, dated Feb. 24, 2017.

Body Tempering web page from <https://web.archive.org/web/20190312011524/https://bodytempering.com/project/order-custom-tempering-tools/>, dated Mar. 12, 2019.

Big Hes Strength Body Tempering Rollers product listings from <https://squareup.com/store/bighesstrength/>, believed to be available prior to Apr. 19, 2019.

Jan. 22, 2021—(WO) ISR and WO—App PCT/US2020/055267.

Youtube, "Donnie Thompson and the Rogue DT Tempering Rollers", Jan. 28, 2019. https://www.youtube.com/watch?v=9pqrh_Pv7Fo. Shown at 1:47 minute mark. (Year: 2019).

Rogue Fitness, "Rogue DT Tempering Roller", Mar. 15, 2021. https://www.roguefitness.com/rogue-dt-tempering-roller. Shown on p. 1. (Year: 2021).

* cited by examiner

ADJUSTABLE WEIGHTED ROLLER

CROSS-REFERENCE TO RELATED APPLICATIONS

This application is a non-provisional of, and claims priority to, U.S. Provisional Application No. 62/913,516, filed Oct. 10, 2019 which prior applications is incorporated by reference herein in its entirety.

FIELD OF THE INVENTION

This disclosure relates to weighted rollers that have structures to provide for adjustable weighting, and more specifically to adjustable weighted rollers configured for use in various musculoskeletal treatments.

BACKGROUND

Various different types of body rollers have been used for various different types of treatments on the human body, including relief of musculoskeletal pain and/or tightness, massage, rehabilitation, athletic training, preparation and/or recovery, and physical therapy, among others. These rollers may achieve effects such as soft tissue mobilization, deep tissue engagement, joint mobilization, improving blood flow, etc. Such rollers often have a cylindrical shape, but may have various other shapes, including various rounded shapes such as spherical, oval/ovoid, conical, etc. Some such rollers may be weighted rollers made from heavy-weight materials and may weigh 50-110 pounds or more. However, weighted rollers are typically provided at a set weight, and mechanisms for quickly and easy changing the weighting (i.e., total weight and/or weight distribution) of such rollers are not readily available.

The present disclosure is provided to address this need and other needs in existing body rollers. A full discussion of the features and advantages of the present invention is deferred to the following detailed description, which proceeds with reference to the accompanying drawings.

BRIEF SUMMARY

Aspects of the disclosure relate to a roller assembly that includes a roller body extending in an axial direction between first and second ends, the roller body having a first end opening at the first end and a first internal cavity extending inwardly along the axial direction from the first end opening and configured to receive a weight assembly including one or more weights, a weight holder received within the first internal cavity and configured for holding the weight assembly within the first internal cavity, and an end cap engaged with the roller body to at least partially cover the first end opening. The weight holder includes a holding member configured to engage the one or more weights to limit movement of the weight assembly transverse to the axial direction, a first engaging member configured to engage a first end of the weight assembly, and a second engaging member configured to engage a second end of the weight assembly spaced from the first end in the axial direction, such that the first and second engaging members are configured to engage the weight assembly to limit movement of the weight assembly along the axial direction. At least one of the first and second engaging members is positionable in a plurality of different axial positions relative to the other of the first and second engaging members, such that the first and second engaging members are configured to accommodate changes in size of the weight assembly. The end cap is configured to be engaged with at least one of the weight holder and the weight assembly to retain the weight holder and the weight assembly within the first internal cavity.

According to one aspect, the second engaging member is defined by an inner side of the end cap that faces into the first internal cavity.

According to another aspect, the holding member includes a shaft extending along the axial direction, the shaft being configured to engage the weight assembly by extending through holes in the one or more weights. In one configuration, the first engaging member is engaged with the shaft and positionable in the plurality of different axial positions by moving the first engaging member along the shaft. In this configuration, the shaft may have a threaded portion, and the first engaging member is threadably engaged with the threaded portion of the shaft and is moveable along the shaft by rotation of the first engaging member. Further, the second engaging member may also be threadably engaged with the threaded portion of the shaft and moveable along the shaft by rotation of the second engaging member. In another configuration, the second engaging member is engaged with the shaft and positionable in the plurality of different axial positions along the shaft.

According to a further aspect, the roller body further has a second end opening at the second end and a second internal cavity extending inwardly along the axial direction from the second end opening and configured to receive a second weight assembly including one or more additional weights. In this configuration, the roller assembly further includes a second weight holder received within the second internal cavity and configured for holding the second weight assembly within the second internal cavity, and a second end cap engaged with the roller body to at least partially cover the second end opening. The second weight holder includes a second holding member configured to engage the one or more additional weights to limit movement of the second weight assembly transverse to the axial direction, a third engaging member configured to engage a first end of the second weight assembly, and a fourth engaging member configured to engage a second end of the second weight assembly spaced from the first end in the axial direction, such that the third and fourth engaging members are configured to engage the second weight assembly to limit movement of the second weight assembly along the axial direction. At least one of the third and fourth engaging members is positionable in a second plurality of different axial positions relative to the other of the third and fourth engaging members, such that the third and fourth engaging members are configured to accommodate changes in size of the second weight assembly. The second end cap is configured to be engaged with at least one of the second weight holder and the second weight assembly to retain the second weight holder and the second weight assembly within the second internal cavity. In one configuration, the holding member and the second holding member are identical, the first engaging member and the third engaging member are identical, and the second engaging member and the fourth engaging member are identical.

According to yet another aspect, the roller assembly includes a retaining member engaged with the roller body and the end cap to releasably retain the end cap in engagement with the roller body. In one configuration, the retaining member includes a threaded fastener extending through a threaded aperture in the roller body to engage the end cap.

According to a still further aspect, the roller assembly further includes the weight assembly, and the one or more weights are insertable and removable from the first internal cavity to change a weighting of the roller assembly.

Additional aspects of the disclosure relate to a roller assembly that includes a roller body extending in an axial direction between first and second ends, the roller body having a first cylindrical roller portion proximate the first end, a first end opening at the first end, and a first internal cavity extending into the first cylindrical roller portion along the axial direction from the first end opening to a first wall surface proximate a center of the roller body, the first internal cavity configured to receive a weight assembly including one or more weights, a weight holder received within the first internal cavity and configured for holding the weight assembly within the first internal cavity, and an end cap received in the first internal cavity to at least partially cover the first end opening. The weight holder includes a shaft having a proximal end engaged with the first wall surface and a distal end opposite the proximal end, the shaft being configured to engage the weight assembly by extending through holes in the one or more weights, and a fixing member engaged with the shaft and positionable in a plurality of different axial positions along the shaft, where the fixing member is configured to engage a proximal end of the weight assembly. The end cap engages the distal end of the shaft, such that the end cap is configured to retain the weight holder and the weight assembly within the first internal cavity, and the end cap is further configured to engage a distal end of the weight assembly, such that the end cap and the fixing member are configured to limit movement of the weight assembly along the axial direction. The roller assembly further includes a retaining member engaged with the roller body and the end cap to releasably retain the end cap in the first internal cavity.

According to one aspect, the shaft has a threaded portion, and the fixing member is threadably engaged with the threaded portion of the shaft and is positionable in the plurality of different axial positions by rotation to move the fixing member along the shaft.

According to another aspect, the retaining member includes a threaded fastener extending through a threaded aperture in the roller body to engage the end cap. In one configuration, the end cap has a recess, and the fastener is configured to be received in the recess to engage the end cap.

According to a further aspect, the end cap may have a receiver, and the distal end of the shaft is received in the receiver. Additionally, or alternatively, the first wall surface of the roller body may have a receiver, and the proximal end of the shaft is received in the receiver.

According to yet another aspect, the roller body includes a second cylindrical roller portion proximate the second end and a center portion located proximate the center of the roller body and between the first and second cylindrical roller portions, where the first and second cylindrical roller portions have equal diameters, and the center portion is curved inwardly from the first and second cylindrical roller portions and has a smaller diameter than the first and second cylindrical roller portions. In one such configuration, the roller body further includes a second end opening at the second end, and a second internal cavity extending into the second cylindrical roller portion along the axial direction from the second end opening to a second wall surface proximate the center of the roller body, the second internal cavity configured to receive a second weight assembly including one or more additional weights. In this configuration, the roller assembly further includes a second weight holder received within the second internal cavity and configured for holding the second weight assembly within the second internal cavity, a second end cap received in the second internal cavity to at least partially cover the second end opening, and a second retaining member engaged with the roller body and the second end cap to releasably retain the second end cap in the second internal cavity. The second weight holder includes a second shaft having a proximal end engaged with the second wall surface and a distal end opposite the proximal end, the second shaft being configured to engage the second weight assembly by extending through holes in the one or more additional weights, and a second fixing member engaged with the second shaft and positionable in a plurality of different axial positions along the second shaft, wherein the second fixing member is configured to engage a proximal end of the second weight assembly. The second end cap engages the distal end of the second shaft, such that the second end cap is configured to retain the second weight holder and the second weight assembly within the second internal cavity, and the second end cap is further configured to engage a distal end of the second weight assembly, such that the second end cap and the second fixing member are configured to limit movement of the second weight assembly along the axial direction. In a further configuration, the roller body further includes a wall located at the center portion and separating the first internal cavity from the second internal cavity, and the first wall surface and the second wall surface are opposite surfaces of the wall.

According to a still further aspect, the first cylindrical roller portion has a spiral groove pattern on an outer surface thereof.

According to an additional aspect, the roller assembly further includes the weight assembly, where the one or more weights are insertable and removable from the first internal cavity to change a weighting of the roller assembly. In this configuration, the fixing member being positionable in the plurality of different axial positions along the shaft is configured to change a spacing between the end cap and the fixing member to accommodate insertion and removal of the one or more weights.

Further aspects of the disclosure relate to a roller assembly that includes a roller body extending between first and second ends, the roller body having a first cylindrical roller portion proximate the first end and a second cylindrical roller portion proximate the second end, a first end opening at the first end, a second end opening at the second end, a first internal cavity extending into the first cylindrical roller portion from the first end opening to a first wall surface proximate a center of the roller body, the first internal cavity configured to receive a first weight assembly including one or more first weights, and a second internal cavity extending into the second cylindrical roller portion from the second end opening to a second wall surface proximate the center of the roller body, the second internal cavity configured to receive a second weight assembly including one or more second weights. The roller assembly also includes a first weight holder received within the first internal cavity and configured for holding the first weight assembly within the first internal cavity, a second weight holder received within the second internal cavity and configured for holding the second weight assembly within the second internal cavity, a first end cap received in the first internal cavity to at least partially cover the first end opening, a first retaining member engaged with the roller body and the first end cap to releasably retain the first end cap in the first internal cavity, a second end cap received in the second internal cavity to at least partially cover the second end opening, and a second retaining member engaged with the roller body and the second end cap to releasably retain the second end cap in the second internal cavity. The first weight holder includes a first shaft having a proximal end engaged with the first wall surface and a distal end opposite the proximal end, the first shaft being configured to engage the first weight assembly by extending through holes in the one or more first weights, and a first fixing member engaged with the first shaft and positionable in a first plurality of different positions along a length of the first shaft, where the first fixing member is configured to engage a proximal end of the first weight assembly. The second weight holder includes a second shaft having a proximal end engaged with the second wall surface and a distal end opposite the proximal end, the second shaft being configured to engage the second weight assembly by extending through holes in the one or more second weights, and a second fixing member engaged with the second shaft and positionable in a second plurality of different positions along a length of the second shaft, where the second fixing member is configured to engage a proximal end of the second weight assembly. The first end cap engages the distal end of the first shaft, such that the first end cap is configured to retain the first weight holder and the first weight assembly within the first internal cavity, and the first end cap is further configured to engage a distal end of the first weight assembly, such that the first end cap and the first fixing member are configured to limit movement of the first weight assembly along the length of the first shaft. The second end cap engages the distal end of the second shaft, such that the second end cap is configured to retain the second weight holder and the second weight assembly within the second internal cavity, and the second end cap is further configured to engage a distal end of the second weight assembly, such that the second end cap and the second fixing member are configured to limit movement of the second weight assembly along the length of the second shaft.

According to one aspect, the first shaft has a first threaded portion, and the first fixing member is threadably engaged with the first threaded portion of the first shaft and is positionable in the first plurality of different positions by rotation to move the first fixing member along the first shaft. Additionally, the second shaft has a second threaded portion, and the second fixing member is threadably engaged with the second threaded portion of the second shaft and is positionable in the second plurality of different positions by rotation to move the second fixing member along the second shaft.

According to another aspect, the first retaining member includes a first threaded fastener extending through a first threaded aperture in the first cylindrical roller portion to engage the first end cap, and the second retaining member includes a second threaded fastener extending through a second threaded aperture in the second cylindrical roller portion to engage the second end cap.

According to a further aspect, the first end cap has a first receiver, and the distal end of the first shaft is received in the first receiver, and the second end cap has a second receiver, and the distal end of the second shaft is received in the second receiver.

According to yet another aspect, the first wall surface of the roller body has a first receiver, and the proximal end of the first shaft is received in the first receiver, and the second wall surface of the roller body has a second receiver, and the proximal end of the second shaft is received in the second receiver.

According to a still further aspect, the roller body further includes a center portion located proximate the center of the roller body and between the first and second cylindrical roller portions and a wall located at the center portion and separating the first internal cavity from the second internal cavity, and the first wall surface and the second wall surface are opposite surfaces of the wall. In one configuration, the first and second cylindrical roller portions have equal diameters, and the center portion is curved inwardly from the first and second cylindrical roller portions and has a smaller diameter than the first and second cylindrical roller portions. In another configuration, the wall completely separates the first internal cavity from the second internal cavity.

According to an additional aspect, the first cylindrical roller portion has a first outer surface with a first spiral groove pattern, and the second cylindrical roller portion has a second outer surface with a second spiral groove pattern.

Still further aspects of the disclosure relate to a roller assembly including a roller body having a rounded outer surface, an end opening, and an internal cavity extending inwardly along an axial direction from the end opening and configured to receive a weight assembly including one or more weights, a weight holder received within the internal cavity and configured for holding the weight assembly within the internal cavity, and a retaining structure engaged with the roller body and configured to retain the weight holder and the weight assembly within the internal cavity. The weight holder includes a first engaging member configured to engage a first end of the weight assembly and a second engaging member configured to engage a second end of the weight assembly spaced from the first end in the axial direction, such that the first and second engaging members are configured to engage the weight assembly to limit movement of the weight assembly along the axial direction. At least one of the first and second engaging members is positionable in a plurality of different axial positions relative to the other of the first and second engaging members, such that the first and second engaging members are configured to accommodate changes in size of the weight assembly.

Other aspects of the disclosure relate to a roller body including a center portion, a first cylindrical end portion extending from a first end of the roller body to the center portion, the first cylindrical end portion having a first end opening at the first end, and a second cylindrical end portion extending from a second end of the roller body to the center portion, the second cylindrical end portion having a second end opening at the second end, where the first and second cylindrical end portions are elongated along the axial direction. The roller body also includes a first internal cavity extending into the first cylindrical end portion along the axial direction from the first end opening to a first wall surface at the center portion, the first internal cavity configured to receive a first weight assembly and a second internal cavity extending into the second cylindrical end portion along the axial direction from the second end opening to a second wall surface at the center portion, the second internal cavity configured to receive a second weight assembly.

According to one aspect, the first and second cylindrical end portions have equal diameters, and the center portion is curved inwardly from the first and second cylindrical end portions and has a smaller diameter than the first and second cylindrical end portions.

According to another aspect, the first cylindrical end portion has a first outer surface with a first spiral groove pattern, the second cylindrical end portion has a second outer surface with a second spiral groove pattern, and the center portion is smooth and inwardly curved from the first and second cylindrical end portions.

Other aspects of the disclosure relate to a weight holder system for use with a roller body having a rounded outer surface, an end opening, and an internal cavity extending inwardly along an axial direction from the end opening to a wall surface and configured to receive a weight assembly including one or more weights. The weight holder system includes a shaft configured to be received in the internal cavity and having a proximal end configured to be engaged with the wall surface and a distal end opposite the proximal end, the shaft being configured to engage the weight assembly by extending through holes in the one or more weights, the shaft further having a threaded portion extending along at least a portion of a length of the shaft, and a fixing member threadably engaged with the threaded portion of the shaft, such that the fixing member is positionable in a plurality of different axial positions along the length of the shaft by rotation to move the fixing member along the shaft, where the fixing member is configured to engage a proximal end of the weight assembly. The weight holder system further includes an end cap engaging the distal end of the shaft, the end cap configured to be received in the internal cavity to at least partially cover the end opening and to retain the shaft, the fixing member, and the weight assembly within the internal cavity.

Other aspects of the disclosure relate to a method that includes engaging a weight assembly comprising one or more weights with a weight holder, including engaging a first engaging member with a first end of the weight assembly, and engaging a second engaging member with a second end of the weight assembly spaced from the first end in an axial direction, such that the first and second engaging members are configured to engage the weight assembly to limit movement of the weight assembly along the axial direction. The method further includes inserting the weight assembly and the weight holder into an internal cavity in a roller body having a rounded outer surface and an end opening, where the internal cavity extends inwardly along an axial direction from the end opening, and engaging a retaining structure with the roller body to retain the weight holder and the weight assembly within the internal cavity.

Other aspects of the disclosure relate to a method that includes engaging an end cap with a weight holder comprising a shaft and a fixing member engaged with the shaft and positionable in a plurality of different positions along a length of the shaft, including engaging a distal end of the shaft with the end cap, and engaging a weight assembly comprising one or more weights with the weight holder by inserting the shaft through holes in the one or more weights and engaging the fixing member with the shaft. In this configuration, the weight assembly is positioned between the end cap and the fixing member, and the end cap and the fixing member engage the weight assembly to limit movement of the weight assembly. The method further includes inserting the weight holder, the end cap, and the weight assembly into an internal cavity in a roller body having a rounded outer surface and an end opening, where the internal cavity extends inwardly along an axial direction from the end opening to a wall surface, such that a proximal end of the shaft engages the wall surface, and the end cap at least partially covers the end opening to retain the weight holder and the weight assembly within the internal cavity, and engaging a retaining member with the roller body and the end cap to releasably retain the end cap in the internal cavity.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
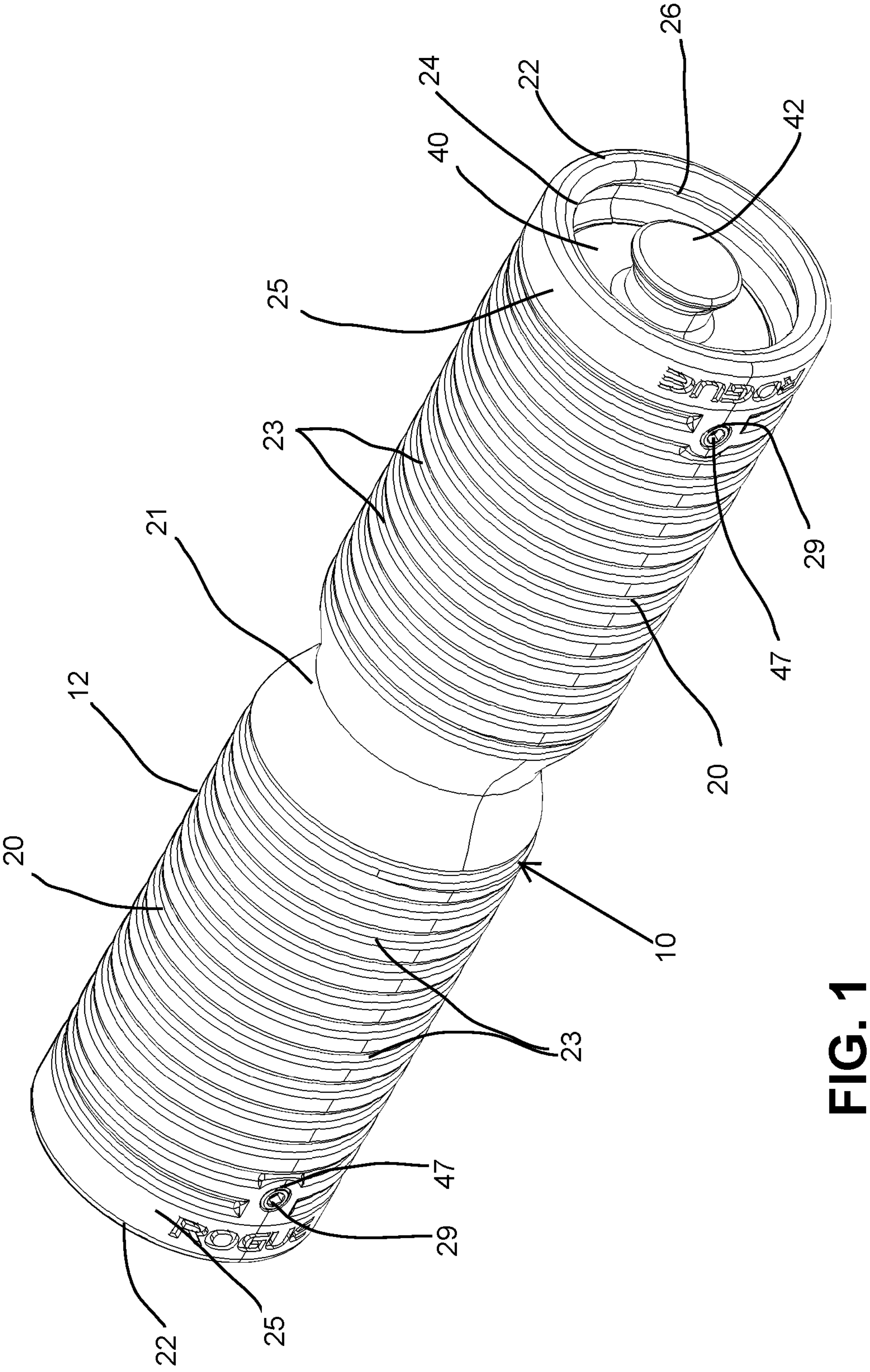
FIG. 1 is a perspective view of one embodiment of a weighted roller in accordance with aspects of the disclosure.
Figure 2:
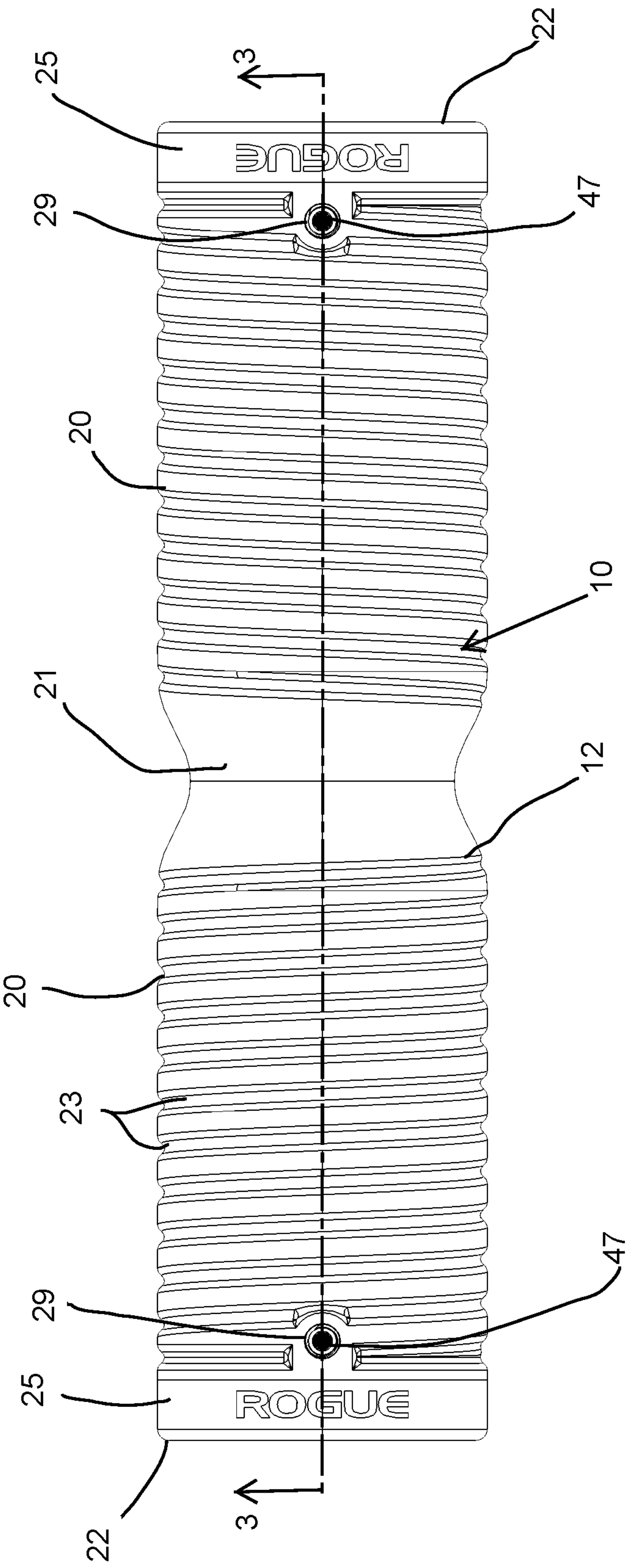
FIG. 2 is a plan view of the weighted roller of FIG. 1.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

FIGS. 1-11 illustrate one embodiment of a weighted roller 10, which generally includes an axially elongated roller body 12 having one or more internal cavities 14, with an adjustable weighting system 16 disposed within the internal cavity or cavities 14 and configured to adjust the weighting of the roller 10. As used herein, “weighting” refers both to the overall weight of an article (e.g., the roller 10) and to the weight distribution of the article. The adjustable weighting system 16 for each cavity 14 includes a weight holder 30 engaged with the roller body 12 and configured to engage and support a weight assembly 54 including one or more weights 50 within the cavity 14 and a retaining structure 64 configured to engage at least one of the weight holder 30 and the weight assembly 54 to retain the weight holder 30 and the weight assembly 54 within the cavity 14. The retaining structure 64 in FIGS. 1-11 is formed by an end cap 40 configured to close the cavity 14 to retain the weights 50 and the weight holder 30 within the cavity 14. The roller 10 in FIGS. 1-11 has two cavities 14 separated by an internal wall 18, with two weight holders 30 each configured to engage and support one or more weights 50 within one of the cavities 14.

The roller body 12 has a rounded outer surface in various embodiments, and may be generally symmetrical in shape. The roller body 12 in FIGS. 1-6 has two generally cylindrical and hollow end roller portions 20 with a center roller portion 21 extending between the end roller portions 20, where the end roller portions 20 each extend from one of two opposed ends 22 to the center roller portion 21. In this configuration, the roller body 12 is elongated between the ends 22. In other embodiments, the roller body 12 may have a different rounded shape, such as spherical, oval/ovoid, conical, etc. The end roller portions 20 have equal outer diameters that are substantially constant from the ends 22 to the center roller portion 21. The two cavities 14 of the roller body 12 are separated by an internal wall 18 that is positioned at the center roller portion 21, such that the cavities 14 are symmetrical and have equal internal diameters and axial lengths. The center roller portion 21 has a necked configuration formed as an annular recess with a smaller outer diameter than the end roller portions 20. In this configuration, the center roller portion 21 has an inwardly curved or indented contour that has a substantial U-shape or V-shape in cross-section, such that the smallest outer diameter of the roller body 12 is located at the center of the center roller portion 21. Each end 22 of the roller body 12 has an opening 24 that is contiguous with the respective cavity 14 to allow access to the cavity 14. Each end roller portion 20 has a cylindrical wall 19 surrounding and defining the cavity 14 and further defining the opening 24. The end roller portions 20 are also configured for gripping at the ends 22 by a user, including flattened sections 25 on the outer surface and internal annular grooves 26 on the inner surface within the cavities 14. In this configuration, the user can grip the roller 10 by placing the palms of the hands on the flattened sections 25, with one or more fingers received in the annular grooves 26, to manipulate the roller 10. The end roller portions 20 in FIGS. 1-6 have a pattern of grooves 23 extending across at least a portion of the axial length of the respective end roller portion 20 that are configured to engage and mobilize tissue of a user (not shown) when the roller 10 is rolled on a part of the user's body. The grooves 23 in the embodiment of FIGS. 1-6 are U-shaped or V-shaped in cross section and extend in a spiral configuration around the periphery of the end roller portions 20 from the flattened sections 25 proximate the ends 22 to the center roller portion 21, terminating at the center roller portion 21. The roller body 12 may be made from a metal material in one embodiment, such as cast iron, and may have an outer diameter of approximately 6 inches in one embodiment.

The roller body 12 further has structures for engaging the weight holder 30 and the end cap 40 to retain the weight holder 30 and the end cap 40 in place. The wall 18 has two centrally-located receivers 27 on opposite wall surfaces 65 that are configured to receive portions of the weight holder 30 as described herein, and each receiver 27 is surrounded by a ramped or beveled section 28 to aid insertion of the portion of the weight holder 30. In other embodiments, the wall surfaces 65 may be defined on separate walls 18 and/or the wall(s) 18 may not completely separate the cavities 14. The roller body 12 also has apertures 29 configured to receive a fastener 47 or other retaining member for engaging the end cap 40. The apertures 29 extend completely through the wall 19 and are open to the exterior of the roller body 12 and the cavity 14. In the embodiment of FIGS. 1-11, the apertures 29 and the fasteners 47 are complementarily threaded, such that the apertures 29 removably engage and retain the fasteners 47 by threaded mating. In another embodiment, the roller 10 may have a single cavity 14 accessible through one or more openings 24 at one or both ends 22, and the roller body 12 may include different structures for engaging and supporting the weight holder(s) 30. In a further embodiment, the two receivers 27 may be connected, such as through an opening in the portion of the wall 18 separating the receivers 27.

Figure 9:
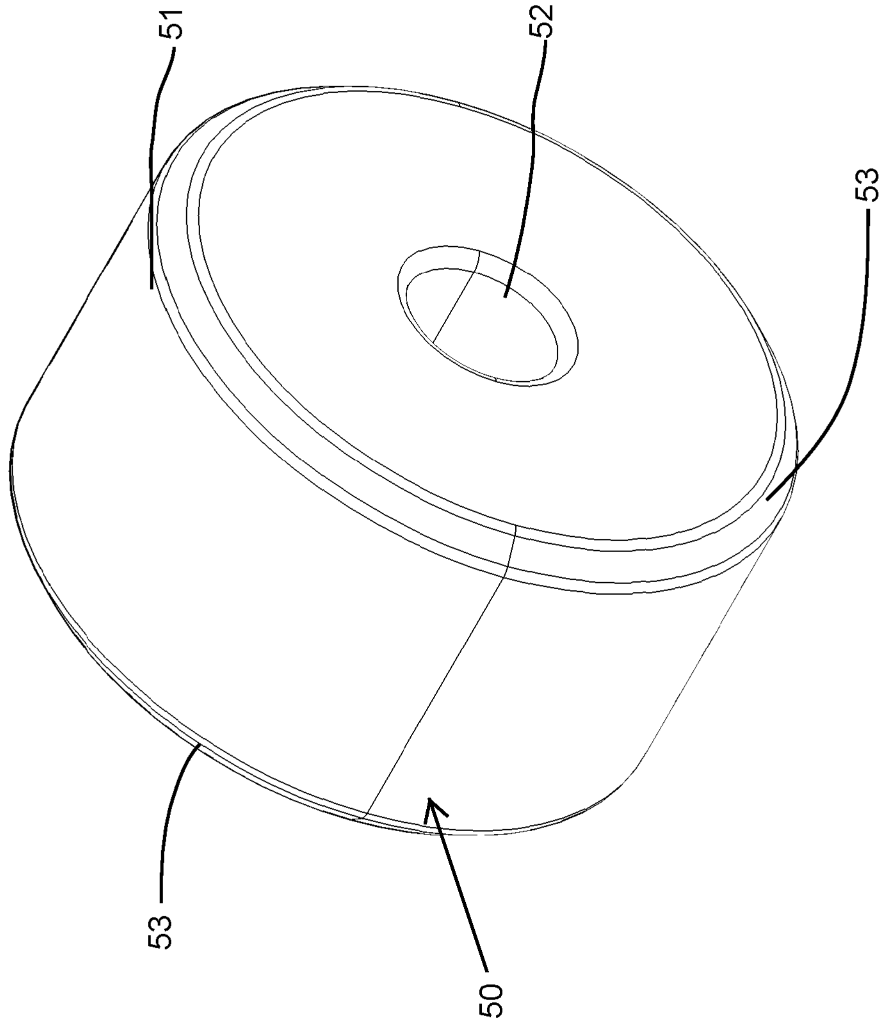
FIG. 9 is a perspective view of a weight member of the weighted roller of FIG. 1.
Figure 10:
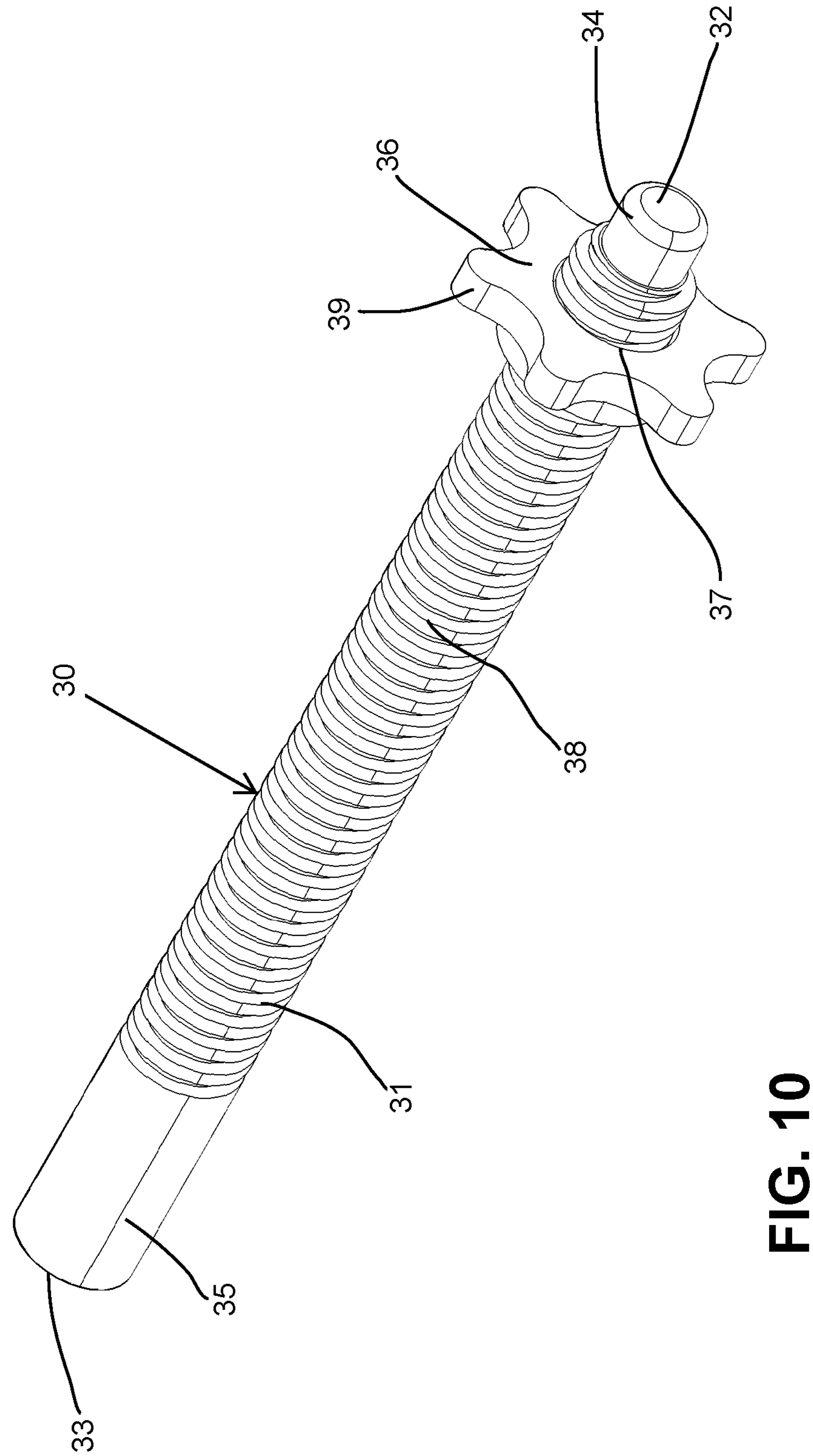
FIG. 10 is a perspective view of a shaft and a fixing member of the weighted roller of FIG. 1, with the fixing device engaged with the shaft.
Figure 11:
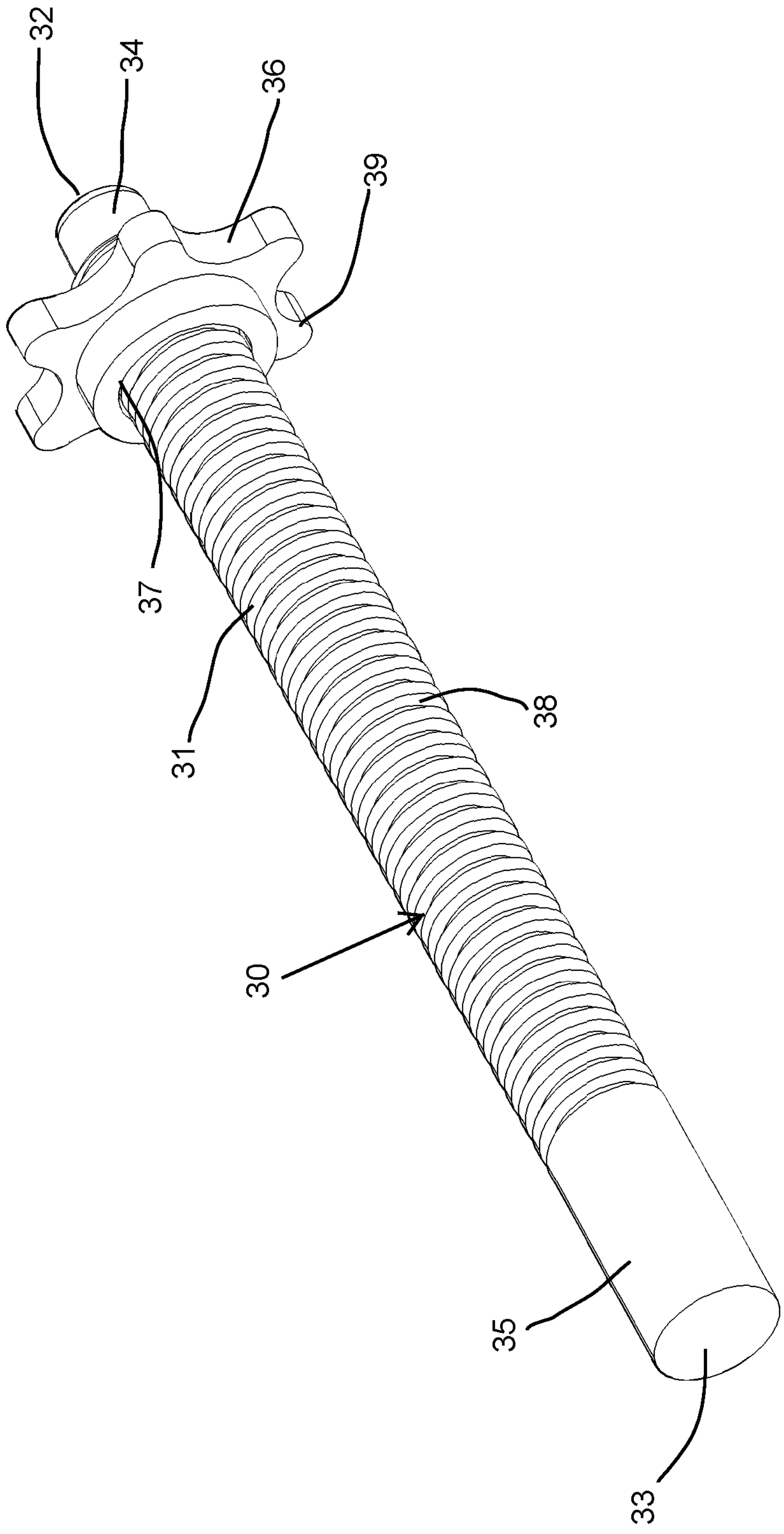
FIG. 11 is another perspective view of the shaft and the fixing member of FIG. 10.

One of the weights 50 in the embodiment of FIGS. 1-11 is shown alone in FIG. 9. The weights 50 in FIGS. 1-11 each have a cylindrical weight body 51 with a hole 52 extending through the center of the body 51. The circumferential edges 53 of the weight body 51 may be beveled or chamfered to ease insertion into and removal from the cavity 14 and to reduce the chance for breakage due to impacts. The weights 50 are configured to be inserted into the cavity 14 so the hole 52 extends axially with respect to the roller body 12, and each weight 50 has a circular diameter that is substantially the same as the internal diameter of the cavity 14 in one embodiment. In the embodiment of FIGS. 1-11, all of the weights 50 are shown as being of identical size and shape, but it is understood that the weights 50 may have other sizes and configurations. For example, weights 50 having a variety of axial thicknesses with equal diameters may be used to provide more precise control of the added weight for the roller 10.

The weight holder 30 generally includes structures for retaining the weight(s) 50 in place within the cavity 14 and allows for inserting or removing weights from the cavity 14 to adjust the total weight of the roller 10. In general, the weight holder 30 is configured for engaging a weight assembly 54 including one or more weights 50, and includes at least a first engaging member 60 that engages a first end 55 of the weight assembly 54 and a second engaging member 61 that engages a second end 56 of the weight assembly 54 to limit movement of the weights 50 weight assembly 54 in the axial direction. The first and second ends 55, 56 of the weight assembly 54 in FIGS. 1-11 are axially spaced and positioned in proximal and distal locations as described herein, i.e., located toward the center of the roller 10 (proximal) or toward the ends 22 of the roller (distal). Thus, the first and second ends 55, 56 of the weight assembly 54 in the embodiment of FIGS. 1-11 may be referred to as proximal and distal ends 55, 56, and the first and second engaging members 60, 61 in this embodiment may be referred to as proximal and distal engaging members 60, 61. It is understood that in another embodiment, the ends 55, 56 of the weight assembly 54 and/or the engaging members 60, 61 may not be identifiable as "proximal" or "distal," such as if the roller 10 includes a single cavity 14 that extends the entire length of the roller body 12, with a single weight assembly 54. At least one of the proximal and distal engaging members 60, 61 is axially moveable and positionable in a plurality of different axial positions with respect to the roller body 12 and/or with respect to the other engaging member 60, 61 to adjust the spacing between the proximal and distal engaging members 60, 61 to accommodate weight assemblies 54 of different sizes and/or changes in the size of the weight assembly 54. The weight holder 30 may further include a holding member 63 for limiting movement of the weight assembly 54 in directions transverse to the axial direction, e.g., a radial direction. In one embodiment, one or both of the engaging members 60, 61 may engage the holding member 63 as well. It is understood that engagement with the surfaces of the roller body 42 defining the cavity 14 may also limit movement of the weight assembly 54 in directions transverse to the axial direction when the weight holder 30 and the weight assembly 54 are received in the cavity 14, potentially limiting such movement to a smaller range than the holding member 63. It is also understood that the holding member 63 may be configured to limit such movement of the weight assembly 54 when the weight holder 30 and the weight assembly 54 are not received in the cavity 14.

In the embodiment of FIGS. 1-11, the weight holder 30 includes a shaft 31 that engages the end cap 40 and the roller body 12 and passes through the hole 52 in one or more weights 50 that are mounted on the shaft 31. The shaft 31 has an outer diameter that is substantially equal to the inner diameter of the holes 52 in the weights 50 in one embodiment. The shaft 31 has a first or proximal end 32 that is received in the receiver 27 or otherwise engaged with the wall 18 and a second or distal end 33 that is received in a receiver 44 on the end cap 40 or otherwise engaged with the end cap 40. In the embodiment of FIGS. 1-11, the proximal end 32 of the shaft 31 has an engaging portion 34 that is is narrowed in diameter relative to the rest of the shaft 31 and configured to engage the receiver 27 of the roller body 12, and the distal end 33 of the shaft 31 has an engaging portion 35 that is configured to engage the receiver 44 of the end cap 40. The weight holder 30 also includes a fixing member 36 that is connectable to the shaft 31 and is adjustable between a plurality of axial positions along the shaft 31. In the embodiment of FIGS. 1-11, the fixing member 36 adjustably connects to the shaft 31 by threading, and the fixing member 36 has a threaded passage 37 that receives and engages the shaft 31 and one or more arms 39 extending outward to facilitate manipulation of the fixing member 36. The shaft 31 includes a threaded portion 38 that engages the fixing member 36 through threaded mating. The engagement between the shaft 31 and the fixing member 36 is shown in more detail in FIGS. 10-11. The threaded engagement between the fixing member 36 and the shaft 31 permits the axial position of the fixing member 36 to be adjusted by rotating the fixing member 36 to move the fixing member 36 along the threaded portion 38. The engaging portions 34, 35 at the proximal and distal ends 32, 33 of the shaft 31 do not have threading in the embodiment of FIGS. 1-11. In another embodiment, the fixing member 36 may engage the shaft 31 in another manner, such as by using a removable pin, a spring-biased pin, a cam-locking mechanism, a clamping mechanism, a gripping mechanism, or other mechanism that permits adjustment of the fixing member 36 along the length of the shaft 31. In a further embodiment, the axial position of the fixing member 36 may be locked or adjusted by engagement with a structure other than the shaft 31, e.g., by engaging the interior surfaces of the cavity 14.

Figure 3:
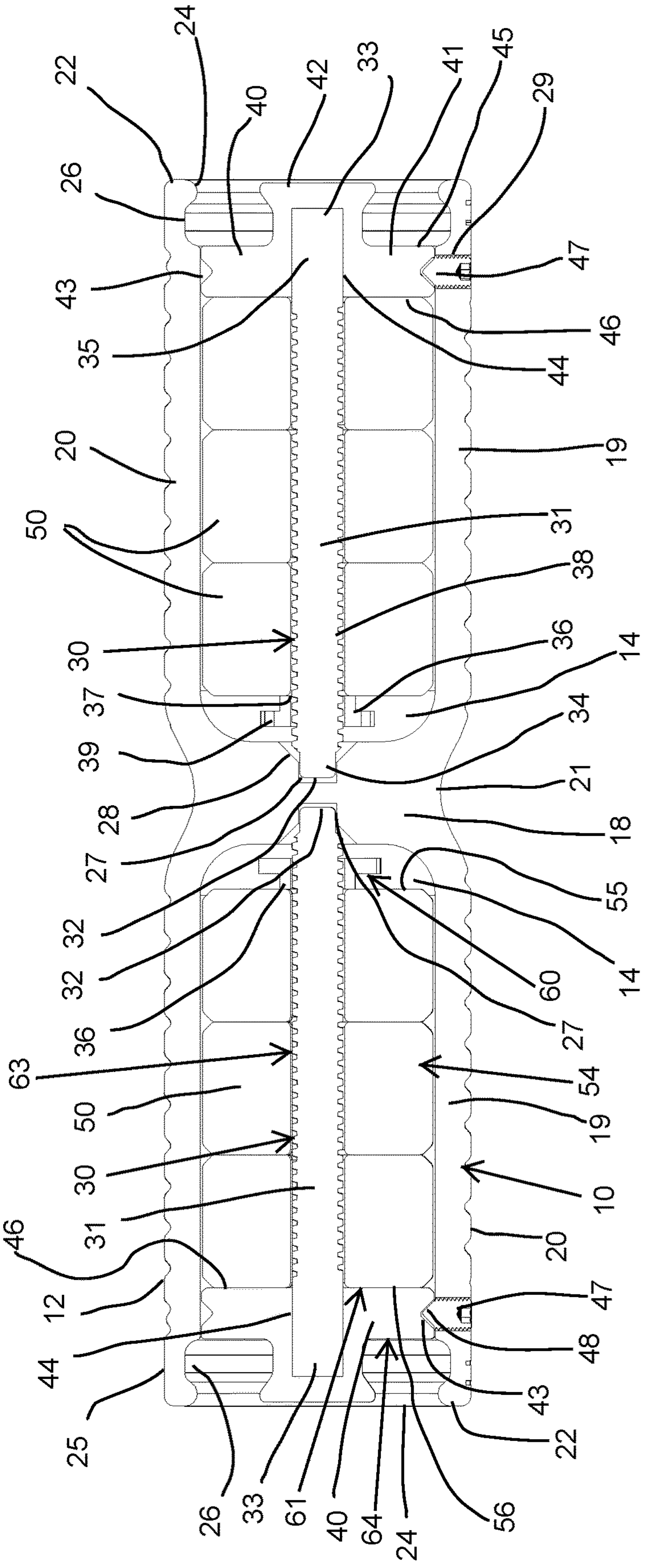
FIG. 3 is a cross-section view taken along line 3-3 of FIG. 2.
Figure 4:
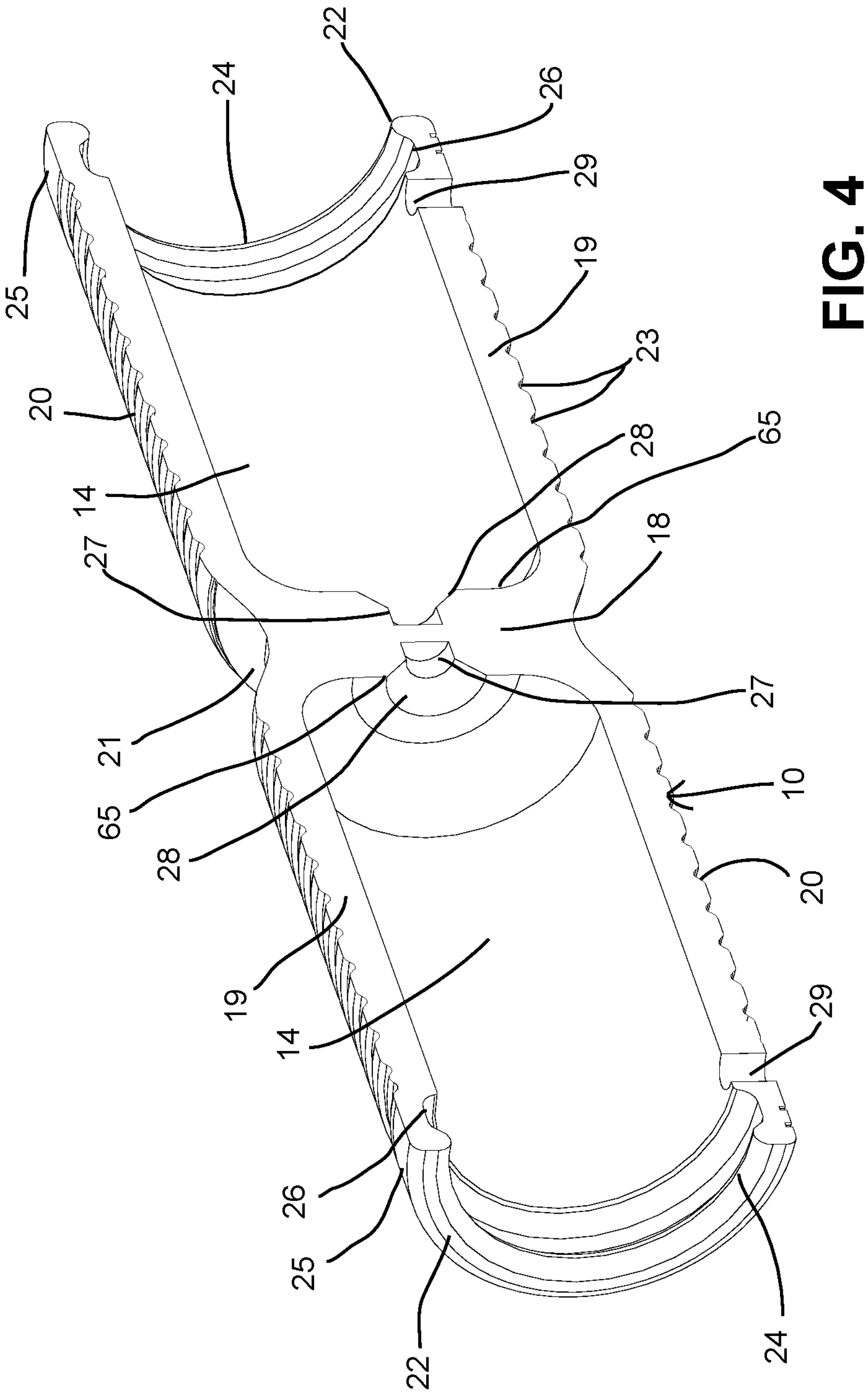
FIG. 4 is a perspective cross-section view of a roller body of the weighted roller of FIG. 3.
Figure 5:
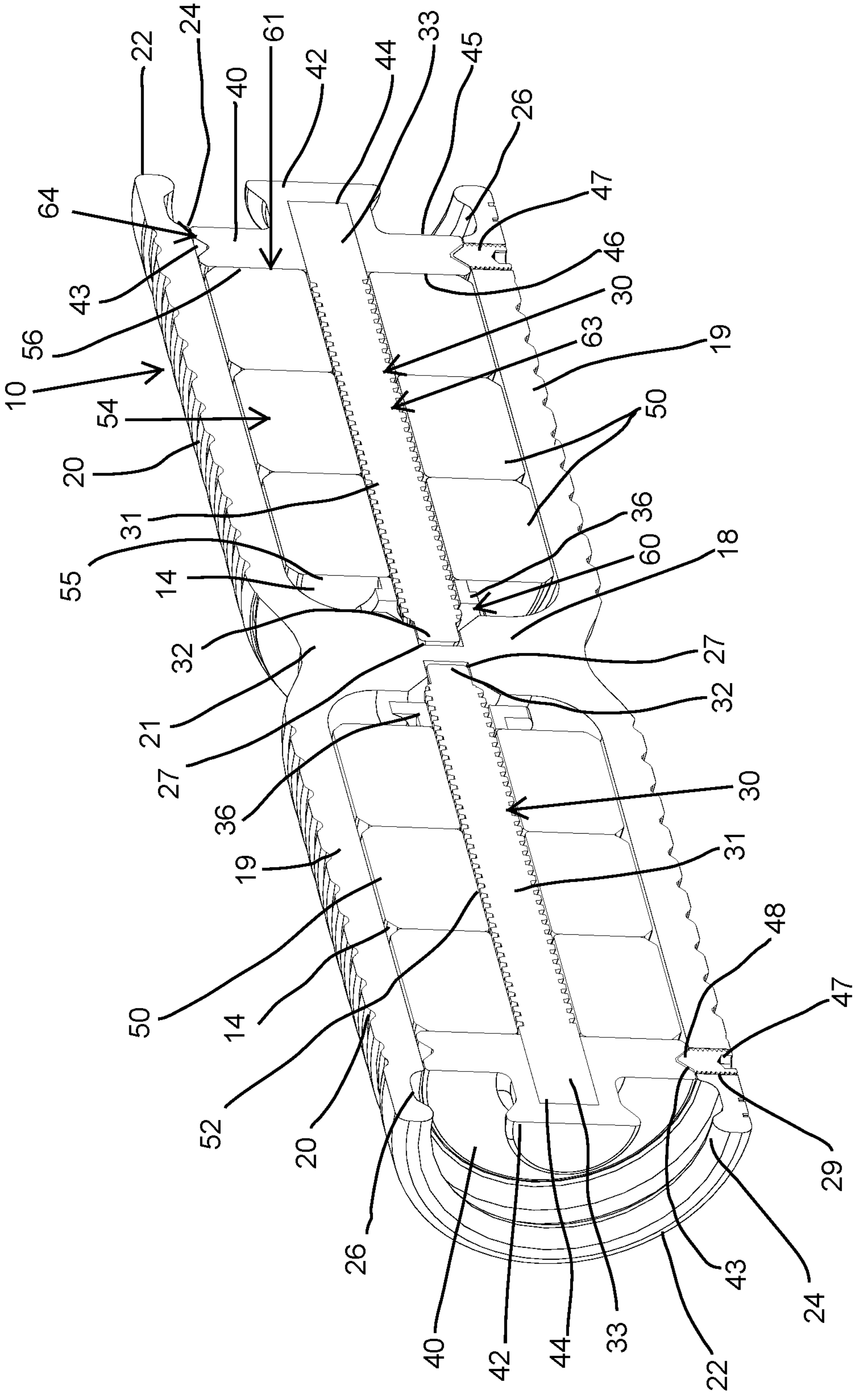
FIG. 5 is a perspective cross-section view of the weighted roller of FIG. 3.
Figure 6:
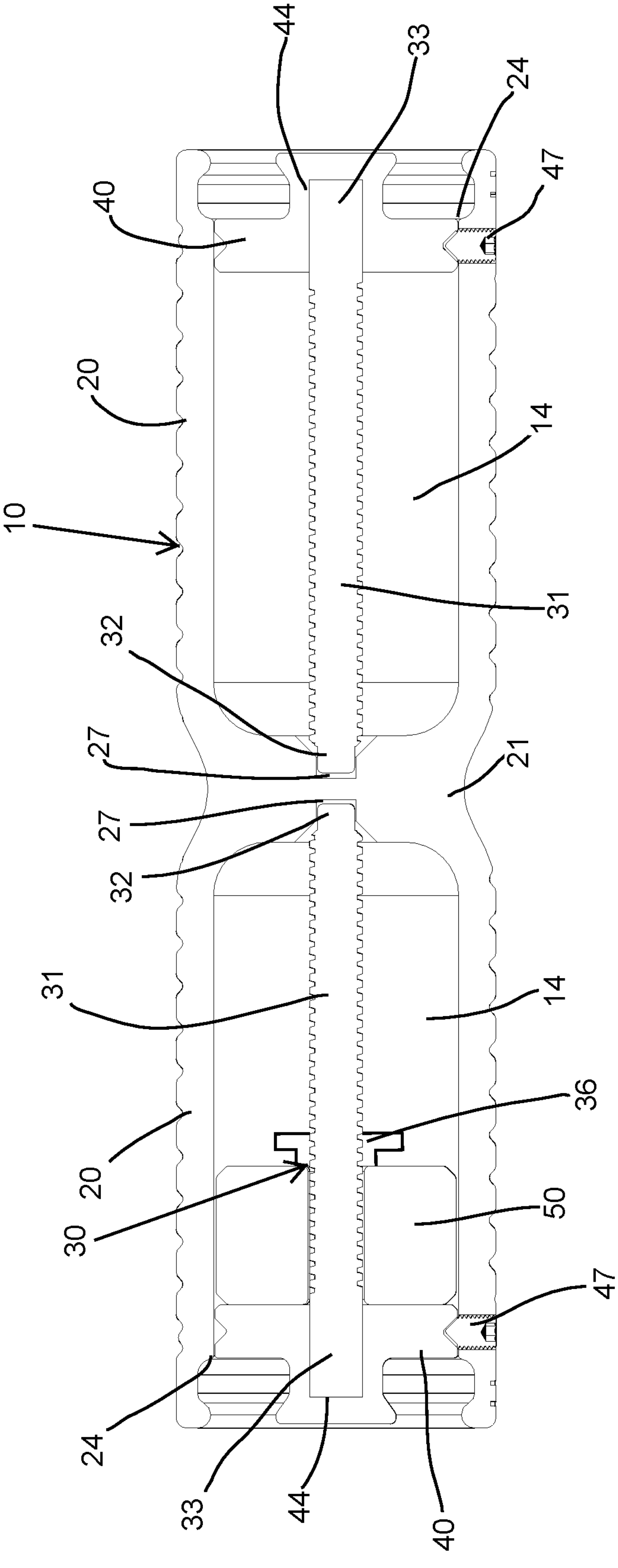
FIG. 6 is a cross-section view of the weighted roller of FIG. 3, after adjustment of an internal weighting of the roller.
Figure 7:
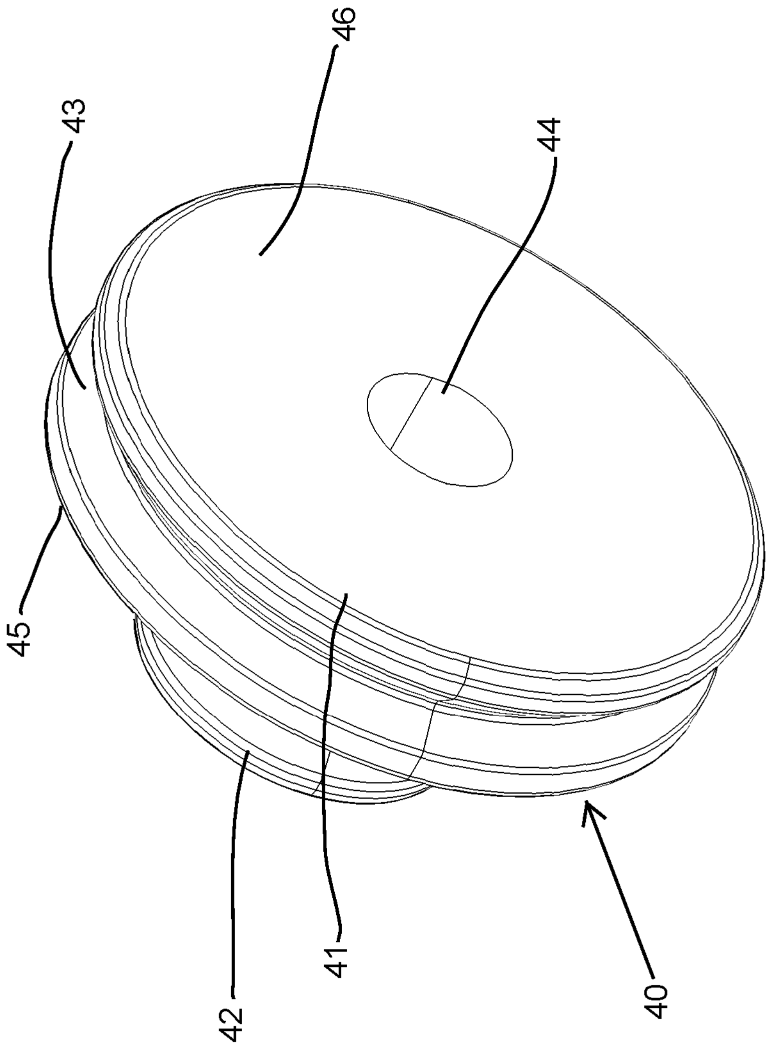
FIG. 7 is a perspective view of an end cap of the weighted roller of FIG. 1.
Figure 8:
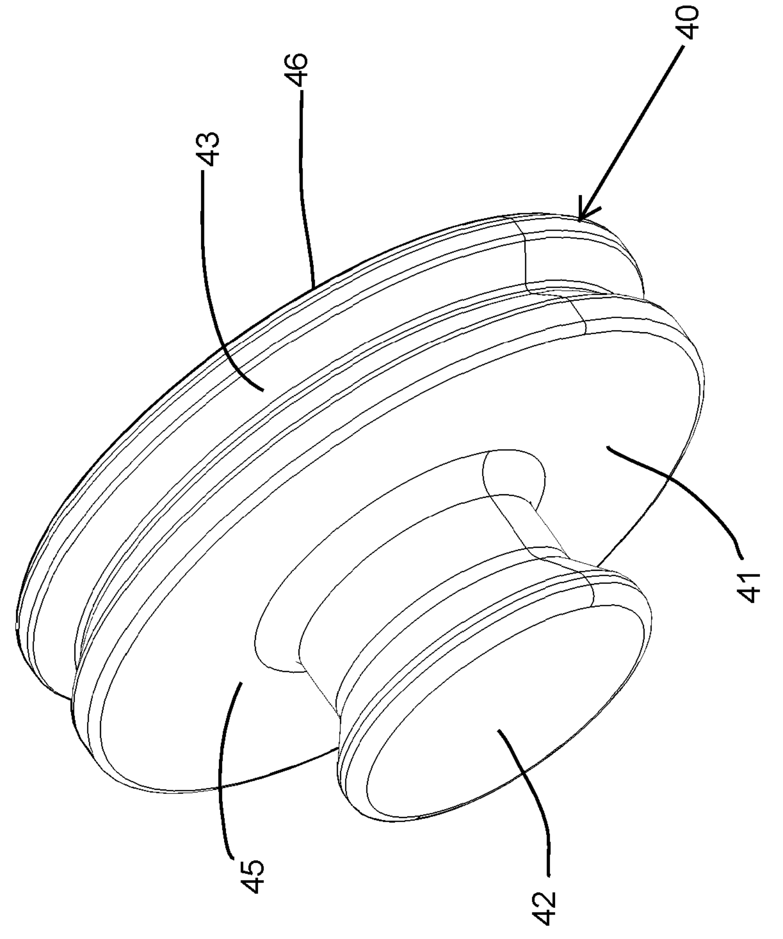
FIG. 8 is another perspective view of the end cap of FIG. 7.

The end cap 40 is configured to be engaged with the roller body 12 to at least partially cover the opening 24. In one embodiment, such as shown in FIGS. 1-11, the end cap 40 is received in the cavity 14 to cover the opening 24 and is also configured to engage the weight holder 30 to retain the weight holder 30 and any weight(s) 50 in position within the cavity 14. The end cap 40 in the embodiment of FIGS. 1-11 is shown alone in FIGS. 7-8. In this embodiment, the end cap 40 has a circular body 41 having an outer diameter that is substantially equal to the internal diameter of the cavity 14, with a handle 42 connected to the outer/distal side 45 of the body 41 for grasping by a user to insert or remove the end cap 40 into or from the cavity 14. The handle 42 in FIGS. 1-11 is in the form of a knob with a flattened, enlarged distal end, and the body 41 has an inner/proximal side 46 facing into the cavity 14. The end cap 40 also has an annular recess 43 extending circumferentially around the body 41 and a structure for engaging the weight holder 30 on the inner/proximal side 46 of the body 41 opposite the handle 42. The structure for engaging the weight holder 30 in the end cap 40 of FIGS. 1-11 is in the form of a receiver 44 extending into the inner side 46 of the body 41 to receive the distal end 33 of the shaft 31. The receiver 44 may extend into the handle 42 in one embodiment, as shown in FIGS. 3, 5, and 6. As described herein, the shaft 31 has an engaging portion 35 at the distal end 33 that is received in the receiver 44 of the end cap 40. The fit between the engaging portion 35 and the receiver 44 may be loose in one embodiment or may be tight (e.g., an interference fit or through use of a friction-enhancing or adhesive material) in another embodiment. The end cap 40 is held in place by a retaining member that engages the roller body 12 and the end cap 40 to retain the end cap 40 in place within the cavity 14. In the embodiment of FIGS. 1-11, this retaining member is in the form of a fastener 47 (e.g., a set screw) that is threadably engaged with the aperture 29 of the roller body 12 and extends into the cavity 14 to engage the end cap 40 and retain the end cap 40 in place. The fastener 47 has a pointed end portion 48 that is received in the recess 43 to engage the end cap 40, as shown in FIGS. 3, 5, and 6. A tool (not shown) for manipulating the fastener 47, e.g., a wrench or driver, may be provided as part of a kit for assembling the roller 10. Other retaining members may be used in other embodiments, such as clamps, brackets, tabs, slots, or rotational engagement structures such as threading or a quarter-turn slot structure, and such retaining members may be integral with the roller body 12 and/or the end cap 40 in some embodiments. In another embodiment, the roller 10 may include a different type of retaining structure 64 to retain the weight holder 30 and the weight assembly 54 within the cavity 14, and the end cap 40 may or may not be included in such an embodiment. For example, the shaft 31 may be engaged with the roller body 12 by threading engagement to form a retaining structure 64, or a separate retaining structure 64 may be provided to engage the roller body 12 and at least one of the weight holder 30 and the weight assembly 54.

In the embodiment of FIGS. 1-11, the inner side 46 of the end cap 40 forms the distal engaging member 61, the fixing member 36 forms the proximal engaging member 60, and the shaft 31 forms the holding member 63. In this configuration, the distal engaging member 61 (inner side 46) is positionable in a single axial position with respect to the roller body 12, and the proximal engaging member 60 (fixing member 36) is positionable in a plurality of axial positions to adjust the spacing between the proximal and distal engaging members 60, 61. The fixing member 36 is positionable in a large (potentially infinite) number of incremental axial positions with respect to the roller body 12 and the inner side 46 of the end cap 46. The holding member 63 (shaft 31) engages the weight assembly 54 to limit radial or transverse movement of the weight(s) 50, via engagement of the shaft 31 with the hole(s) 52 in the weight(s) 50. In another embodiment, a proximal engaging member 60 may be configured for fixing in different axial positions using a different engagement structure, which may provide a more limited number of axial positions of the fixing member 36.

For example, a proximal and/or distal engaging member 60, 61 may be configured for engaging another structure (e.g., the roller body 42 and/or the shaft 31) at one or more different defined stop points, such as holes, recesses, projections, etc. Such an engaging member 60, 61 may include an engaging structure for engaging such a stop point, such as a pin or projection to engage a hole or recess, a receiver or complementary projection for engaging a projection, or other engaging structure. As one example, the proximal and/or distal engaging member 60, 61 may be a locking pin (e.g., a cotter pin or a clip) that can be inserted and locked in a plurality of different apertures along the length of the shaft 31. As another example, the proximal and/or distal engaging member 60, 61 may have projections or other portions configured for rotating to be engaged with a plurality of slots along the length of the shaft 31 or the inner surface of the roller body 12 for locking in different axial positions (e.g., a quarter-turn configuration). It is understood that other embodiments of proximal and/or distal engaging members 60, 61 may be used in other embodiments, which may or may not engage or require the use of the shaft 31. For example, in one embodiment, the roller 10 may not include a weight holder 30 and may instead include an axially adjustable stop (e.g., an adjustable-length spacer) to form the proximal and/or distal engaging members 60, 61. As another example, in one embodiment, the weight holder 30 may include external members that at least partially surround the weight(s) 50, such as a cage or shell.

Figure 12:
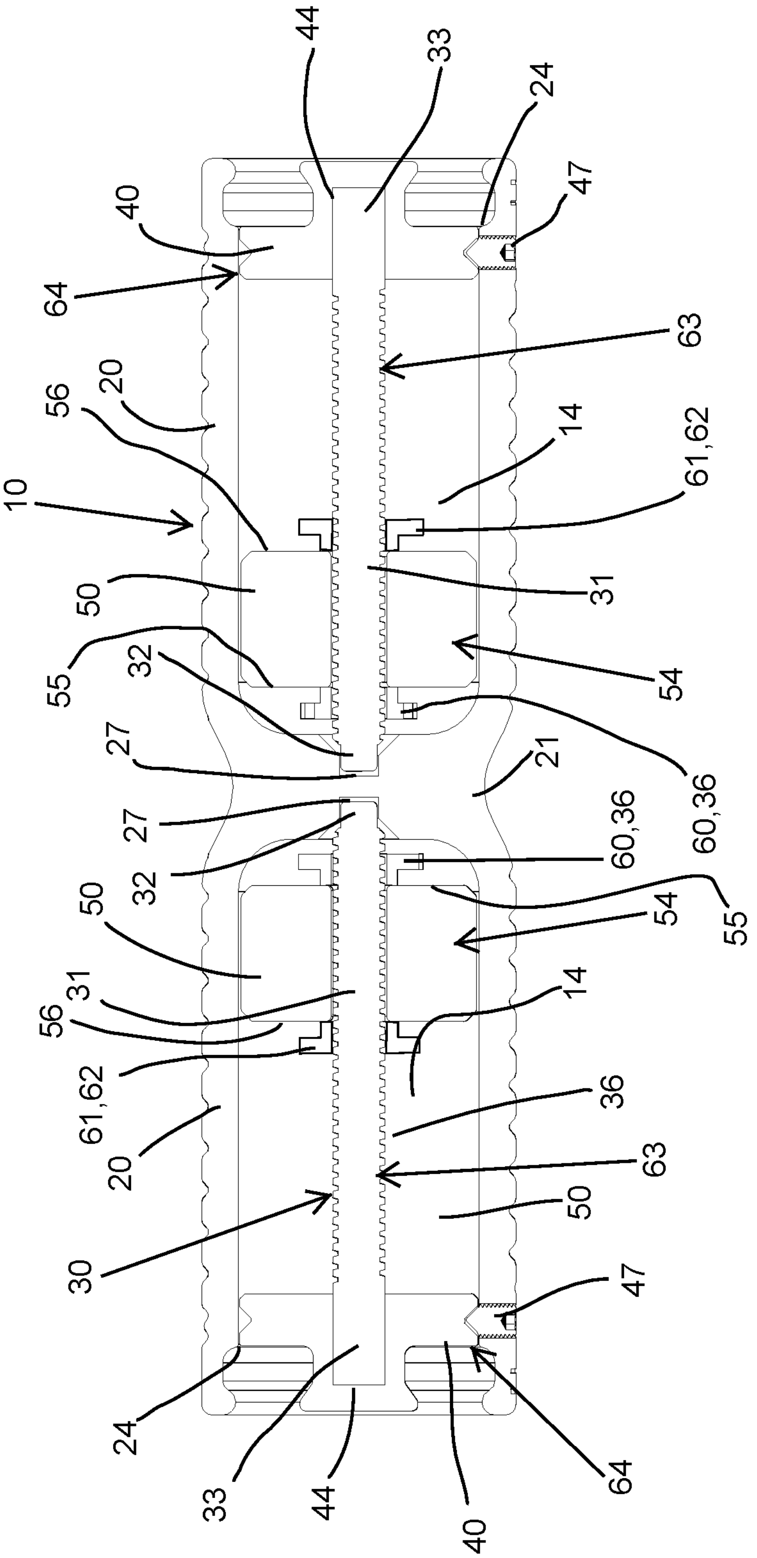
FIG. 12 is a cross-section view of another embodiment of a weighted roller in accordance with aspects of the disclosure.

FIG. 12 illustrates another embodiment of a weighted roller 10 that is generally identical to the roller 10 in FIGS. 1-11 described herein other than the differences described herein. The roller 10 in FIG. 12 may include any variations or alternate embodiments of the roller 10 of FIGS. 1-11 as described herein, and the roller 10 in FIG. 12 is therefore not described again in detail for the sake of brevity, with the same reference numbers being used to reference the same components in FIG. 12. The embodiment of FIG. 12 includes a distal fixing member 62 that forms the distal engaging member 61. The distal fixing member 62 is threaded to be axially adjustable along the shaft 31 by rotation as described herein. In this embodiment, the fixing member 36 may also be adjustable as described herein, or may be axially fixed in position, e.g., near the proximal end 32 of the shaft 31. The use of two adjustable fixing members 62 permits additional control over weight distribution in some circumstances. In another embodiment, the fixing member 36 may be absent, and the roller 10 may include a stop surface (e.g., one or more flanges, projections, or other diameter reductions, or a spacer) forming the proximal engaging member 60.

Various materials may be used in construction of the roller 10. In one embodiment, all components are made of a metal material, such as cast iron, steel, aluminum, etc. For example, in one embodiment the roller body 12, the shafts 31, the end caps 40, and the weights 50 may be made from cast iron, and the fixing member 36 and the fasteners 47 may be made from steel. Powder coating and/or other surface treatment may be applied to the surfaces of certain components of the roller 10, such as the roller body 12, the weights 50, the shafts 31, and/or the end caps 40. The roller body 12 may be formed from a single, integral piece in one embodiment, such as through a casting process. The weights 50 may be made from a ceramic material or a mixture of materials in a further embodiment.

The roller 10 in FIGS. 1-11 may be assembled in one embodiment by inserting the distal end 33 of the shaft 31 into the receiver 44 of the end cap 40, then placing any desired weights 50 onto the shaft 31 by inserting the shaft 31 through the hole(s) 52 in the weight(s) 50. The fixing member 36 is then connected to the shaft 31 and adjusted to engage the proximal-most weight 50 and compress the weights 50 between the fixing member 36 and the inner side 46 of the end cap 40. In the embodiment of FIG. 12, the distal fixing member 62 is connected to the shaft 31 and adjusted to the proper position during this process, such as before inserting the shaft 31 into hole(s) 52 in the weight(s) 50. The end cap 40, the weight holder 30, and the weight(s) 50 are then inserted into one of the cavities 14 of the roller body 12 through the opening 24, such that the proximal end 32 of the shaft 31 is received in the receiver 27 in the roller body 12. The fastener 47 is then inserted into the aperture 29 and tightened against the end cap 40 to retain the end cap 40 in place. The weighting of the roller 10 can be adjusted by removing the components from the cavity 14, removing the fixing member 36, adding to or removing weights 50 from the shaft 31, and then reconnecting the fixing member 36 and re-inserting the components into the cavity 14 as described above. FIGS. 3 and 5 illustrate a configuration where three weights 50 are connected within each cavity 14 of the roller body 12, and FIG. 6 illustrates a configuration where one weight 50 is connected within the left-side cavity 14 and no weights 50 are used in the right-side cavity 14. FIG. 6 also illustrates a configuration where the weight distribution of the roller 10 has been altered so the center of gravity is not located at the axial center of the roller body 12. It is understood that the end cap 40 and shaft 31 may be used without the fixing member 36, or the roller body 12 may be used without the end cap 40 and/or the shaft 31, if no weights 50 are used.

Adjustment of weights 50 in this manner permits great flexibility in adjustment of the overall weight of the roller 10. In one embodiment, the roller body 12 weighs 70 lbs., the two weight holders 30 and the two end caps 40 together weigh 10 lbs., and each of the weights 50 weighs 10 lbs. In this configuration, the weight of the roller 10 can be adjusted between 70 lbs. and 140 lbs. as desired.

Various embodiments of adjustable rollers have been described herein, which include various components and features. In other embodiments, the rollers may be provided with any combination of such components and features. It is also understood that in other embodiments, the various devices, components, and features of the rollers described herein may be constructed with similar structural and functional elements having different configurations, including different ornamental appearances.

The adjustable rollers described herein provide numerous benefits and advantages over existing rollers. For example, the features of the roller provide the ability to adjust the weighting of the roller quickly and easily, with minimal necessary tooling, as the only tool required is a tool (e.g., a wrench or driver) to manipulate the fastener 47. As another example, the features of the roller allow the weighting of the roller to be adjusted multiple times, indefinitely as desired. Some existing rollers provide customizable weights that are permanent or semi-permanent once assembled, such as by filling the roller with a desired amount of cement. As a further example, the fit between components of the roller resist movement or sliding of the internal components during use or movement. Still other benefits and advantages are recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. As used in this application: the term “axial” refers to the direction along the elongated length of the roller 10; the term “radial” refers to any direction perpendicular to the axial direction, e.g., along any radius of a cross-section of the roller 10 taken perpendicular to the axial direction; and the terms “proximal” and “distal” are relative terms referring to structures located toward the center of the roller 10 (proximal) or toward the ends 22 of the roller (distal), respectively, in the axial direction. Terms such as “axial,” “radial,” “inner,” “outer,” “side,” “proximal,” “distal,” and the like, as used herein, are intended for illustrative purposes only and do not limit the embodiments in any way. When used in description of a method or process, the term “providing” (or variations thereof) as used herein means generally making an article available for further actions, and does not imply that the entity “providing” the article manufactured, assembled, or otherwise produced the article. Nothing in this specification should be construed as requiring a specific three dimensional orientation of structures in order to fall within the scope of this invention, unless explicitly specified by the claims. Additionally, the term “plurality,” as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A roller assembly comprising:

a roller body extending in an axial direction between first and second ends, the roller body having a first cylindrical roller portion proximate the first end, a first end opening at the first end, and a first internal cavity extending into the first cylindrical roller portion along the axial direction from the first end opening to a first wall surface proximate a center of the roller body, the first internal cavity configured to receive a weight assembly including one or more weights;

a weight holder received within the first internal cavity and configured for holding the weight assembly within the first internal cavity, the weight holder comprising:

a shaft having a proximal end engaged with the first wall surface and a distal end opposite the proximal end, the shaft being configured to engage the weight assembly by extending through holes in the one or more weights; and a fixing member engaged with the shaft and positionable in a plurality of different axial positions along the shaft, wherein the fixing member is configured to engage a proximal end of the weight assembly, wherein the shaft has a threaded portion, and wherein the fixing member is threadably engaged with the threaded portion of the shaft and is positionable in the plurality of different axial positions by rotation to move the fixing member along the shaft;

an end cap received in the first internal cavity to at least partially cover the first end opening and engaging the distal end of the shaft, such that the end cap is configured to retain the weight holder and the weight assembly within the first internal cavity, and wherein the end cap is further configured to engage a distal end of the weight assembly, such that the end cap and the fixing member are configured to limit movement of the weight assembly along the axial direction; and a retaining member engaged with the roller body and the end cap to releasably retain the end cap in the first internal cavity.

2. The roller assembly of claim 1, wherein the retaining member comprises a threaded fastener extending through a threaded aperture in the roller body to engage the end cap.

3. The roller assembly of claim 2, wherein the end cap has a recess, and the fastener is configured to be received in the recess to engage the end cap.

4. The roller assembly of claim 1, wherein the end cap has a receiver, and the distal end of the shaft is received in the receiver.

5. The roller assembly of claim 1, wherein the first wall surface of the roller body has a receiver, and the proximal end of the shaft is received in the receiver.

6. The roller assembly of claim 1, wherein the roller body comprises a second cylindrical roller portion proximate the second end and a center portion located proximate the center of the roller body and between the first and second cylindrical roller portions, wherein the first and second cylindrical roller portions have equal diameters, and the center portion is curved inwardly from the first and second cylindrical roller portions and has a smaller diameter than the first and second cylindrical roller portions.

7. The roller assembly of claim 6, wherein the roller body further comprises a second end opening at the second end, and a second internal cavity extending into the second cylindrical roller portion along the axial direction from the second end opening to a second wall surface proximate the center of the roller body, the second internal cavity configured to receive a second weight assembly including one or more additional weights, the roller assembly further comprising:

a second weight holder received within the second internal cavity and configured for holding the second weight assembly within the second internal cavity, the second weight holder comprising:

a second shaft having a proximal end engaged with the second wall surface and a distal end opposite the proximal end, the second shaft being configured to engage the second weight assembly by extending through holes in the one or more additional weights; and a second fixing member engaged with the second shaft and positionable in a plurality of different axial positions along the second shaft, wherein the second fixing member is configured to engage a proximal end of the second weight assembly;

a second end cap received in the second internal cavity to at least partially cover the second end opening and engaging the distal end of the second shaft, such that the second end cap is configured to retain the second weight holder and the second weight assembly within the second internal cavity, and wherein the second end cap is further configured to engage a distal end of the second weight assembly, such that the second end cap and the second fixing member are configured to limit movement of the second weight assembly along the axial direction; and a second retaining member engaged with the roller body and the second end cap to releasably retain the second end cap in the second internal cavity.

8. The roller assembly of claim 7, wherein the roller body further comprises a wall located at the center portion and separating the first internal cavity from the second internal cavity, and wherein the first wall surface and the second wall surface are opposite surfaces of the wall.

9. The roller assembly of claim 1, wherein the first cylindrical roller portion has a spiral groove pattern on an outer surface thereof.

10. The roller assembly of claim 1, further comprising the weight assembly, wherein the one or more weights are insertable and removable from the first internal cavity to change a weighting of the roller assembly, and wherein the fixing member being positionable in the plurality of different axial positions along the shaft is configured to change a spacing between the end cap and the fixing member to accommodate insertion and removal of the one or more weights.

11. A roller assembly comprising:

a roller body extending in an axial direction between first and second ends, the roller body having a first end opening at the first end and a first internal cavity extending inwardly along the axial direction from the first end opening and configured to receive a weight assembly including one or more weights;

a weight holder received within the first internal cavity and configured for holding the weight assembly within the first internal cavity, the weight holder comprising:

a holding member configured to engage the one or more weights to limit movement of the weight assembly transverse to the axial direction, wherein the holding member comprises a shaft extending along the axial direction, the shaft being configured to engage the weight assembly by extending through holes in the one or more weights;

a first engaging member configured to engage a first end of the weight assembly, wherein the shaft has a threaded portion, and wherein the first engaging member is threadably engaged with the threaded portion of the shaft and is moveable along the shaft by rotation of the first engaging member; and a second engaging member configured to engage a second end of the weight assembly spaced from the first end in the axial direction, such that the first and second engaging members are configured to engage the weight assembly to limit movement of the weight assembly along the axial direction, wherein at least one of the first and second engaging members is positionable in a plurality of different axial positions relative to the other of the first and second engaging members, such that the first and second engaging members are configured to accommodate changes in size of the weight assembly, and wherein the first engaging member is positionable in the plurality of different axial positions by moving the first engaging member along the shaft; and an end cap engaged with the roller body to at least partially cover the first end opening and configured to be engaged with at least one of the weight holder and the weight assembly to retain the weight holder and the weight assembly within the first internal cavity.

12. The roller assembly of claim 11, wherein the second engaging member comprises an inner side of the end cap that faces into the first internal cavity.

13. The roller assembly of claim 11, wherein the second engaging member is also threadably engaged with the threaded portion of the shaft and is moveable along the shaft by rotation of the second engaging member.

14. The roller assembly of claim 11, wherein the second engaging member is engaged with the shaft and positionable in the plurality of different axial positions along the shaft.

15. The roller assembly of claim 11, wherein the roller body further has a second end opening at the second end and a second internal cavity extending inwardly along the axial direction from the second end opening and configured to receive a second weight assembly including one or more additional weights, and wherein the roller assembly further comprises:

a second weight holder received within the second internal cavity and configured for holding the second weight assembly within the second internal cavity, the second weight holder comprising:

a second holding member configured to engage the one or more additional weights to limit movement of the second weight assembly transverse to the axial direction;

a third engaging member configured to engage a first end of the second weight assembly; and a fourth engaging member configured to engage a second end of the second weight assembly spaced from the first end in the axial direction, such that the third and fourth engaging members are configured to engage the second weight assembly to limit movement of the second weight assembly along the axial direction, wherein at least one of the third and fourth engaging members is positionable in a second plurality of different axial positions relative to the other of the third and fourth engaging members, such that the third and fourth engaging members are configured to accommodate changes in size of the second weight assembly; and a second end cap engaged with the roller body to at least partially cover the second end opening and configured to be engaged with at least one of the second weight holder and the second weight assembly to retain the second weight holder and the second weight assembly within the second internal cavity.

16. The roller assembly of claim 15, wherein the holding member and the second holding member are identical, the first engaging member and the third engaging member are identical, and the second engaging member and the fourth engaging member are identical.

17. The roller assembly of claim 11, further comprising a retaining member engaged with the roller body and the end cap to releasably retain the end cap in engagement with the roller body.

18. The roller assembly of claim 17, wherein the retaining member comprises a threaded fastener extending through a threaded aperture in the roller body to engage the end cap.

19. The roller assembly of claim 11, further comprising the weight assembly, wherein the one or more weights are insertable and removable from the first internal cavity to change a weighting of the roller assembly.

20. A roller assembly comprising:

a roller body extending between first and second ends, the roller body having a first cylindrical roller portion proximate the first end and a second cylindrical roller portion proximate the second end, a first end opening at the first end, a second end opening at the second end, a first internal cavity extending into the first cylindrical roller portion from the first end opening to a first wall surface proximate a center of the roller body, the first internal cavity configured to receive a first weight assembly including one or more first weights, and a second internal cavity extending into the second cylindrical roller portion from the second end opening to a second wall surface proximate the center of the roller body, the second internal cavity configured to receive a second weight assembly including one or more second weights;

a first weight holder received within the first internal cavity and configured for holding the first weight assembly within the first internal cavity, the first weight holder comprising:

a first shaft having a proximal end engaged with the first wall surface and a distal end opposite the proximal end, the first shaft being configured to engage the first weight assembly by extending through holes in the one or more first weights; and a first fixing member engaged with the first shaft and positionable in a first plurality of different positions along a length of the first shaft, wherein the first fixing member is configured to engage a proximal end of the first weight assembly, wherein the first shaft has a first threaded portion, and the first fixing member is threadably engaged with the first threaded portion of the first shaft and is positionable in the first plurality of different positions by rotation to move the first fixing member along the first shaft;

a second weight holder received within the second internal cavity and configured for holding the second weight assembly within the second internal cavity, the second weight holder comprising:

a second shaft having a proximal end engaged with the second wall surface and a distal end opposite the proximal end, the second shaft being configured to engage the second weight assembly by extending through holes in the one or more second weights; and a second fixing member engaged with the second shaft and positionable in a second plurality of different positions along a length of the second shaft, wherein the second fixing member is configured to engage a proximal end of the second weight assembly, wherein the second shaft has a second threaded portion, and the second fixing member is threadably engaged with the second threaded portion of the second shaft and is positionable in the second plurality of different positions by rotation to move the second fixing member along the second shaft;

a first end cap received in the first internal cavity to at least partially cover the first end opening and engaging the distal end of the first shaft, such that the first end cap is configured to retain the first weight holder and the first weight assembly within the first internal cavity, and wherein the first end cap is further configured to engage a distal end of the first weight assembly, such that the first end cap and the first fixing member are configured to limit movement of the first weight assembly along the length of the first shaft;

a first retaining member engaged with the roller body and the first end cap to releasably retain the first end cap in the first internal cavity;

a second end cap received in the second internal cavity to at least partially cover the second end opening and engaging the distal end of the second shaft, such that the second end cap is configured to retain the second weight holder and the second weight assembly within the second internal cavity, and wherein the second end cap is further configured to engage a distal end of the second weight assembly, such that the second end cap and the second fixing member are configured to limit movement of the second weight assembly along the length of the second shaft; and a second retaining member engaged with the roller body and the second end cap to releasably retain the second end cap in the second internal cavity.

21. The roller assembly of claim 20, wherein the first retaining member comprises a first threaded fastener extending through a first threaded aperture in the first cylindrical roller portion to engage the first end cap, and wherein the second retaining member comprises a second threaded fastener extending through a second threaded aperture in the second cylindrical roller portion to engage the second end cap.

22. The roller assembly of claim 20, wherein the first end cap has a first receiver, and the distal end of the first shaft is received in the first receiver, and wherein the second end cap has a second receiver, and the distal end of the second shaft is received in the second receiver.

23. The roller assembly of claim 20, wherein the first wall surface of the roller body has a first receiver, and the proximal end of the first shaft is received in the first receiver, and wherein the second wall surface of the roller body has a second receiver, and the proximal end of the second shaft is received in the second receiver.

24. The roller assembly of claim 20, wherein the roller body further comprises a center portion located proximate the center of the roller body and between the first and second cylindrical roller portions and a wall located at the center portion and separating the first internal cavity from the second internal cavity, and wherein the first wall surface and the second wall surface are opposite surfaces of the wall.

25. The roller assembly of claim 24, wherein the first and second cylindrical roller portions have equal diameters, and the center portion is curved inwardly from the first and second cylindrical roller portions and has a smaller diameter than the first and second cylindrical roller portions.

26. The roller assembly of claim 24, wherein the wall completely separates the first internal cavity from the second internal cavity.

27. The roller assembly of claim 20, wherein the first cylindrical roller portion has a first outer surface with a first spiral groove pattern, and the second cylindrical roller portion has a second outer surface with a second spiral groove pattern.

* * * * *